(12) United States Patent
Elwell

(10) Patent No.: US 8,714,441 B2
(45) Date of Patent: May 6, 2014

(54) SYSTEMS AND APPARATUS FOR EXPRESSING MULTIMEDIA PRESENTATIONS CORRESPONDING TO PRINT MEDIA

(71) Applicant: Sean Elwell, Woodbury, CT (US)

(72) Inventor: Sean Elwell, Woodbury, CT (US)

(73) Assignee: Eye Ear It, LLC, Woodbury, CT (US)

( * ) Notice: Subject to any disclaimer, the term of this patent is extended or adjusted under 35 U.S.C. 154(b) by 0 days.

(21) Appl. No.: 13/721,569

(22) Filed: Dec. 20, 2012

(65) Prior Publication Data

US 2013/0193202 A1    Aug. 1, 2013

Related U.S. Application Data

(63) Continuation-in-part of application No. 13/108,541, filed on May 16, 2011, now Pat. No. 8,336,787, which is a continuation of application No. 11/842,567, filed on Aug. 21, 2007, now Pat. No. 7,975,928.

(60) Provisional application No. 60/897,278, filed on Jan. 25, 2007, provisional application No. 60/839,331, filed on Aug. 22, 2006.

(51) Int. Cl.
*G07F 17/00* (2006.01)

(52) U.S. Cl.
USPC .................. 235/375; 235/472.01; 235/462.45

(58) Field of Classification Search
USPC .......................... 235/375, 486, 472.01, 462.45
See application file for complete search history.

(56) References Cited

U.S. PATENT DOCUMENTS

| | | |
|---|---|---|
| 5,502,304 A | 3/1996 | Berson |
| 5,869,828 A | 2/1999 | Braginsky |
| 6,094,279 A | 7/2000 | Soscia |
| 6,102,505 A * | 8/2000 | McIntyre et al. ................. 347/2 |
| 6,141,441 A | 10/2000 | Cass |
| 6,166,496 A | 12/2000 | Lys et al. |
| 6,340,868 B1 | 1/2002 | Lys et al. |
| 6,375,075 B1 | 4/2002 | Ackley |
| 6,502,756 B1 | 1/2003 | Fahraeus |
| 6,548,768 B1 | 4/2003 | Pettersson et al. |
| 6,561,429 B2 | 5/2003 | Bryant |
| 6,577,080 B2 | 6/2003 | Lys et al. |
| RE38,286 E | 10/2003 | Flowers |
| 6,666,376 B1 | 12/2003 | Ericson |
| 6,667,695 B2 | 12/2003 | Pettersson et al. |
| 6,674,427 B1 | 1/2004 | Pettersson et al. |
| 6,732,927 B2 | 5/2004 | Olsson et al. |
| 6,788,011 B2 | 9/2004 | Mueller et al. |
| 6,801,003 B2 | 10/2004 | Schanberger et al. |
| 6,836,555 B2 | 12/2004 | Ericson et al. |
| 6,882,338 B2 | 4/2005 | Flowers |
| 6,888,322 B2 | 5/2005 | Dowling et al. |
| 6,905,391 B2 | 6/2005 | Soto et al. |
| 6,967,448 B2 | 11/2005 | Morgan et al. |

(Continued)

*Primary Examiner* — Edwyn Labaze

(74) *Attorney, Agent, or Firm* — UConn IP Law Clinic; Susan K. Pocchiari; Camille Sauer

(57) ABSTRACT

A media asset system and method is provided comprising a handheld reader having a sensor enabled to detect a discrete coded zone within a visual image, with the reader capable of producing an output signal corresponding to the discrete coded zone. An output device responds to the output signal with an audio output presentation corresponding to the discrete coded zone. Output is responsive to the reader's selection of output action, and may also be provided for in a video presentation.

7 Claims, 5 Drawing Sheets

(56) References Cited

U.S. PATENT DOCUMENTS

| | | |
|---|---|---|
| 7,068,262 B2 | 6/2006 | Perkins et al. |
| 7,120,386 B1 | 10/2006 | Lynch et al. |
| 7,139,523 B1 | 11/2006 | Lynch et al. |
| 7,186,003 B2 | 3/2007 | Dowling et al. |
| 7,224,348 B2 | 5/2007 | Perkins et al. |
| 7,242,152 B2 | 7/2007 | Dowling et al. |
| 7,248,239 B2 | 7/2007 | Dowling et al. |
| 7,256,554 B2 | 8/2007 | Lys |
| RE39,881 E | 10/2007 | Flowers |
| 7,281,664 B1 | 10/2007 | Thaeler et al. |
| 7,347,760 B2 | 3/2008 | Wood et al. |
| 7,374,087 B1 | 5/2008 | Edgecomb |
| 7,499,036 B2 | 3/2009 | Flowers |
| 7,553,160 B2 | 6/2009 | Wood et al. |
| 7,557,696 B2 | 7/2009 | Brinton |
| 7,562,822 B1 | 7/2009 | Schmidt et al. |
| 7,661,592 B1 | 2/2010 | Chisholm et al. |
| 7,832,645 B2 | 11/2010 | Chen |
| 7,853,193 B2 | 12/2010 | Marggraff et al. |
| 7,916,124 B1 | 3/2011 | Wood et al. |
| 7,922,099 B1 | 4/2011 | Schmidt et al. |
| 2004/0056101 A1 | 3/2004 | Barkan |
| 2009/0028382 A1 | 1/2009 | Erol |
| 2009/0189981 A1* | 7/2009 | Siann et al. .......... 348/143 |
| 2010/0019040 A1* | 1/2010 | Haber et al. .......... 235/440 |

\* cited by examiner

# SYSTEMS AND APPARATUS FOR EXPRESSING MULTIMEDIA PRESENTATIONS CORRESPONDING TO PRINT MEDIA

CROSS-REFERENCE TO RELATED APPLICATIONS

This application is a Continuation-In-Part of U.S. application Ser. No. 13/108,541 filed May 16, 2011, which issued as U.S. Pat. No. 8,336,787 on Dec. 25, 2012, which is a Continuation of U.S. application Ser. No. 11/842,567 filed Aug. 21, 2007, which issued as U.S. Pat. No. 7,975,928 on Jul. 12, 2011, which claims priority to U.S. Provisional Application No. 60/897,278 filed Jan. 25, 2007 and U.S. Provisional Application No. 60/839,331 filed Aug. 22, 2006. All recited applications are incorporated herein by reference in their entirety and priority is claimed under all these applications.

TECHNICAL FIELD

The invention relates generally to a method for supplementing the information available in a print medium by providing access to multi-media. More particularly, the invention relates to a system which uses color coded zones in a printed surface to provide a portal to sound, video, web-based or other media. Even more particularly, the invention relates to the use of a system employing both invisible and visible printed inks and specific wavelengths of light to activate sound signals, video, and/or web-based media.

BACKGROUND OF THE INVENTION

Most printed surfaces are silent and static, i.e., they do not emit sounds or display visual information relating to the objects depicted on the surface. Examples of such surfaces include the pages of books, magazines, newspapers, board games and displays.

Audiotapes, compact discs and other media can provide an audible version of the content of books. Computer systems and programs are known to provide that content on a display. Some computer programs highlight words as they are read as well as provide an audio version of the content being highlighted. Other computer systems and programs allow a user to click on a word or image to provide additional audio and visual information relating to the content. These conventional systems, however, are not part of the actual print medium and they lack the look and feel of the print medium.

Conventional systems also exist that use a scanner or stylus to scan a printed surface imprinted with a conventional two dimensional proprietary pattern (i.e. bar code) or applied medallion. These systems, however, are not ideal for printed surfaces because they involve distracting or unattractive extraneous indicia imprinted in the printed surface.

Systems that employ optical readers or other types of detectors to detect images, symbols, and barcodes in printed materials are disclosed in U.S. Pat. No. 6,722,569. The '569 patent discloses an optical reader that determines whether a captured image on printed material is a color or photographic image or a symbol.

U.S. Pat. No. 6,375,075 discloses a symbol image sensor that includes one or more filters which remove or reduce certain wavelengths of light reflected from the symbol to create color separations at the image sensor. In the '075 patent, a comparator, such as a microprocessor, programmed general purpose computer, or digital logic circuit can determine the position and color of the various elements of the symbol based on the decoded image data produced by the sensor.

Systems have also been developed in which sound data have been encoded into a printed surface and can be extracted using readers that decode the encoded information. It is sometimes desirable to encode data, including sound data, onto a reflective print having an image, symbol or barcode. The sound data, which may be optically readable, provides information relating to the image. The sound data may be encoded onto the print so that it overlays the image, or alternatively, is encoded in a margin surrounding the image on the print. A reader is typically provided which reads the encoded data and emits sound corresponding to that data. U.S. Pat. No. 5,502,304 discloses systems wherein sound data is imprinted in the form of a machine readable code, such as a barcode, onto a still form reflection print, or, invisible ink is used to form a scanable barcode encoding sound information.

U.S. Pat. No. 6,561,429 discloses an adjustable reader and a method of reading encoded indicia on an object. The reader includes a detector for detecting the indicia and an emitter coupled to the detector for emitting a signal encoded by the indicia. The indicia of the prior art, which can be a sound indicia is formed out of an invisible dye. The sound indicia of the prior art is preferably a dye having special absorption in the infrared region or ultraviolet region of the radiation spectrum. Such a dye is selected so that the dye does not absorb or fluoresce light in the human visible spectrum, but which is visible to optical reading devices capable of illuminating the indicia with infrared or ultraviolet light. For this purpose, the dye of the prior art may be 4,4"-bis(triazin-2-ylamino)stilbene-2,2'-disulfonic acids; 2-(stilben-4-y)naphthotriasoles; or 2-(4-phenylstelben-4-yl)benzoxazoles, or other suitable dye.

Other systems which use detectors to detect and trigger the expression of encoded multimedia content, including sounds, from printed material include those disclosed in U.S. Pat. No. 6,556,690. The '690 patent discloses a system where data is encoded in an image field on a photographic print and can be reproduced as sound information.

U.S. Pat. No. 6,094,279 discloses a system and process that uses infrared dyes to integrate data, in a visually imperceptible form, into a printed color image. This system allows for encoding of voice or sound data into a still print and uses an optical reader.

Still other systems employ areas called "active colors" on the print. Active colors are colored areas that can be recognized by a detector and decoded. U.S. Pat. No. 5,869,828 discloses a color coding system for encoding information on products and other substrates where the color code is printed using single intensity colors in specific shapes that can be easily read.

U.S. Pat. No. 6,141,441 discloses a technique for decoding message data that has been encoded into a printed color image made up of small color regions called signal cells that carry the encoded message.

Printed surfaces can provide more valuable sources of information if the images can be expressed in audio, visual or other form in addition to the static image on the surface. For example, children and adults who are learning how to read could benefit from books and other print media that provide information relating to the visual images in sound and/or video form. Users who are visually impaired or have a learning disability could similarly benefit from such a system. Readers who are trying to learn a foreign language could benefit from a system that provides audio output of the print content.

The art has heretofore not provided systems which can express the visual content of the printed medium in audio, video or web-based form. A simple yet comprehensive and unobtrusive system is needed for providing audio, visual and/or other expressions corresponding to the print content.

OBJECTS OF THE INVENTION

It is a primary object of the present invention to provide a surface having visible images thereon with indicia coding for an output presentation in audio, visual or other media format and means for reading those indicia to trigger the presentations.

It is a related object of the invention to provide a user-friendly, educational or entertainment tool employing light as a means of triggering an audio presentation, web-based streaming video or flash media presentation, or other media presentations from a printed surface to enhance the educational or entertainment value thereof.

It is a further object of the invention to provide a simple, user-friendly system for detecting and triggering media presentation in audio, web-based streaming video, or flash media format using a portable handheld device to trigger discrete coded zones encoded in different portions of the surface.

SUMMARY OF THE INVENTION

The present invention provides a media asset system which comprises a surface containing a discrete coded zone within a visual image corresponding to a predetermined output presentation; a handheld reader with a sensor enabled to detect the discrete coded zone, wherein the reader is capable of producing an output signal corresponding to the discrete coded zone; and an audio output device for presenting the output signal corresponding to the discrete coded zone. In another embodiment, the system further comprises a video output device for presenting the predetermined output presentation.

In a preferred embodiment, the sensor is enabled to receive a light signal from a source, and the system further comprises a memory having a plurality of files, a processor in communication with the sensor, the memory, and the output device, wherein the processor selects from the plurality of files, where a file corresponds to a discrete coded zone and initiates some predetermined output presentation as prescribed by the file. Preferably this source contains the discrete coded zone. It is further preferred that the sensor is enclosed within a sensor housing configured to displace the sensor from the surface so that the sensor effectively reads light from the surface and curtains off extraneous light. Preferably, the sensor housing comprises an opening of sufficient size to read the discrete coded zone. This system further comprises an outer sensing around the sensor housing. This outer housing is preferably transparent. One or more light sources may be located in a space between the sensor housing and outer housing. The memory may be removable from the system.

The discrete coded zone is preferred to be substantially imperceptible to the human eye. The discrete coded zone may contain a substance that is essentially invisible to the human eye, and becomes additionally perceptible by the sensor when illuminated by one or more wavelengths of light.

In another embodiment, the handheld reader and audio output device are encompassed in a housing. The audio output device may be external to the handheld reader. The system may further comprise a charger cradle or cable for recharging the handheld reader. The system may also comprise a download cradle or cable configured to download files for the handheld reader.

In another embodiment, the discrete coded zone corresponds to an internet address, and the handheld reader is capable of sending to a receiver a wireless signal containing data enabling the internet address to be accessed and the predetermined output presentation to be presented. Alternatively, the discrete coded zone may contain textual words or images and the predetermined output presentation corresponds to the textual words or images.

The present invention also provides a media asset method for presenting a predetermined output presentation comprising the steps of directing a beam of light at a discrete coded zone, causing the discrete coded zone to become additionally perceptible to a sensor of a handheld reader; detecting the discrete coded zone using the sensor; selecting a predetermined output presentation corresponding to the discrete coded zone, wherein the predetermined output presentation is stored in a memory; and presenting the predetermined output presentation through an audio output device in response to the handheld reader's detection of the discrete coded zone. This method may further comprise the step of presenting the predetermined output presentation through a video output device in response to the detection of the discrete coded zone. The discrete coded zone may also contain textual words or images and the predetermined output presentation corresponds to the textual words or said images.

Furthermore, the invention presents a surface including one or more visible images and one or more discrete coded zones corresponding to a particular medium of expression, wherein one or more discrete coded zones are capable of reflecting light within the visible spectrum in response to a beam of light directed by a handheld reader, and one or more of the discrete coded zones are within one or more of the visual images.

BRIEF DESCRIPTION OF THE DRAWINGS

FIG. 3A is partial view of the handheld reader, showing only the top portion. FIGS. 3B-F show the whole handheld reader in an isometric view, front view, side view, bottom view, and top view, respectively.

Figure 1A:
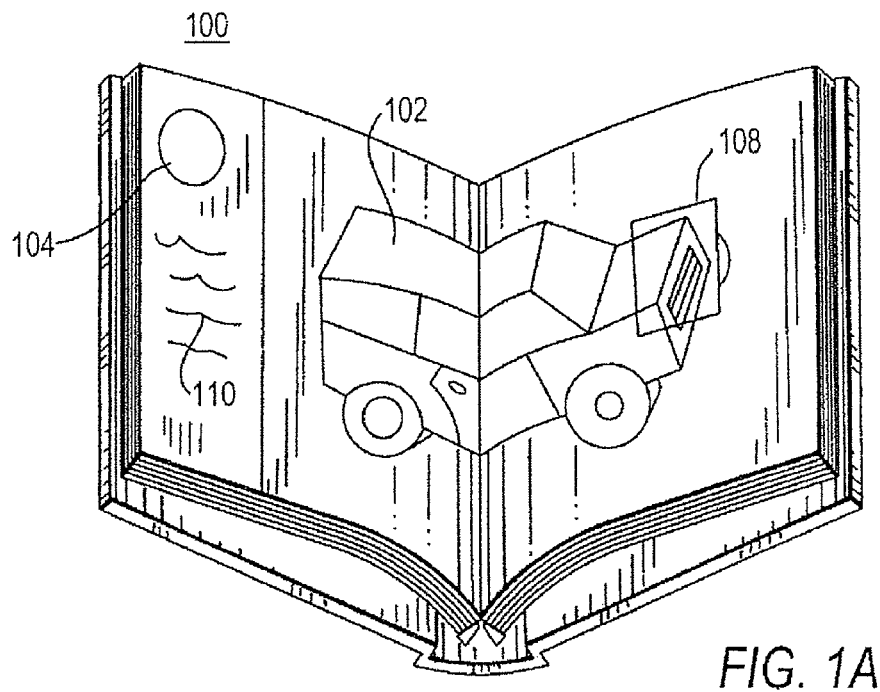
FIG. 1A is a printed page of a children's book using the present invention depicting visual information and discrete coded zones encoding for an audio presentation.

The subject matter which is regarded as the invention is particularly pointed out and distinctly claimed in the concluding portion of the specification. The aforementioned figures share constituent elements with other figures. Therefore, shared constituent elements will be referred to using the same reference numerals, and an explanation thereof will be omitted. The invention, however, both as to organization and method of practice, together with the further objects and advantages thereof, may best be understood by reference to the following description taken in connection with the accompanying drawings in which:

DETAILED DESCRIPTION

The present invention is a system for activating audio, web-based streaming video, flash animation or other media presentations from a visible surface, e.g., a printed surface. The surface includes one or more visible images and one or more discrete coded zones which encode for a particular audio, video or other media presentation. As used herein the term "visual surface" may include any surface which includes one or more visual representations. Visual surfaces include, without limitation, the pages of print media, game boards, packaging, signs, exhibits or three-dimensional objects.

In an alternative embodiment of the invention, the printed surface contains a plurality of visual images and includes one or more discrete coded zones which encode for a particular sound. Each of those zones are surrounded by or overlaid with an essentially invisible substance, e.g., an invisible ink, which becomes additionally perceptible when light is shone upon it. The ink is invisible to the user but can be detected when light of a certain wavelength causes it to fluoresce and the fluorescent light is detected.

The system includes a handheld reader for triggering the presentation which comprises a light source and a sensor for detecting light reflected from one or more discrete coded zones which code for the presentation. One preferred embodiment of this system includes a sound player which plays a sound when light is reflected from a discrete coded zone and is detected by the sensor. In an alternative embodiment of this system, the reader detects a discrete coded zone in the printed surface that corresponds to an internet address. The handheld reader sends a wireless signal to a receiver, such as a computer, to access a predetermined output presentation, such as a particular webpage, flash media, or streaming video content. In addition to flash media, the system can employ various types of web based media, including, but not limited to, HTML, XML, databases, JAVA and JAVA applets, Flash and other vector based graphics, rastor graphics, audio, image types including .jpeg and .gif image types, video, documents including .doc and .pdf document types, and hypertext markup languages.

The handheld reader may comprise a flashlight-like reader capable of directing a first beam of violet light, followed by a second beam of white light, within the visible spectrum. The first beam serves to determine whether or not invisible ink is present on the printed surface. In a preferred embodiment, the first beam generates violet light of 405 nm which causes the invisible ink to fluoresce and that fluorescent light is detected. The second beam serves to establish the color value of the visible ink printed on the surface. While described for convenience as a "flashlight," the reader of the invention includes any convenient, handheld housing which contains the several components of the triggering device.

The handheld reader includes a light sensor for detecting light of different wavelengths within the visible spectrum. A light sensor functions like a color measuring chip, as it detects light fluorescing from the invisible ink when that ink is contacted by the beam on the violet edge of the visible spectrum and it detects light within the visible spectrum reflected from the discrete coded zones. The handheld reader includes a switch activated by the light sensor when light is detected. If invisible ink is detected on the surface to be measured, a switch activates a processor which causes the flashlight to emit the second beam of white light. When visible light reflected from the colored zone is detected, a sound player is activated which plays a particular audible message encoded in the discrete coded zone.

An inner, opaque, sensor housing curtains off ambient light and contains the light sensor and sources of light. The sensor housing desirably makes even contact with the surface of the printed medium. An outer housing is positioned around the sensor housing to permit the flashlight to be centered on a discrete coded zone. The outer housing desirably has a circumference such that both the visual image and the discrete coded zone, if any, are encompassed by the outer housing. This arrangement shields the sensor from outside light and avoids a variation or fluctuation in color measurement by the sensor.

The forward part of the flashlight has a first light emitting diode for emitting a first beam of violet light, a second light emitting diode for emitting a second beam of white light and a light detector for detecting wavelengths of light reflected from the discrete coded zone.

The forward part of the flashlight comprises an inner, sensor housing surrounding the first light emitting diode, the second light emitting diode and the light detector. The length of the sensor housing is set to space the light detector at a predetermined distance from the discrete coded zones so that it can accurately measure light reflected from those zones. Desirably the configuration of the opening of the housing matches that of the discrete coded zone so the light detector can detect essentially all of the light reflected by the discrete coded zone at which it is directed. The forward part of the flashlight has an outer housing circumferentially surrounding the sensor housing. The diameter of the outer housing is set so that the outer cone, and the flashlight itself, can be centered on, i.e. registered on a visual image and so that the visual image and the discrete coded zone contained within that image, if any, are both encompassed by the outer housing.

In a preferred embodiment of the invention, the outer housing may be transparent. This will permit the user to view a message, such as a printed word, written with invisible ink within the coded zone. The user can then see and read the information displayed between the inside of the transparent outer housing and the outer edge of the opaque sensor housing. To illuminate these otherwise invisible characters, the forward part of the flashlight may have third and fourth light emitting diodes which emit violet light. These are located between the inner sensor housing and the outer housing.

The central part of the flashlight houses a first switch activated by a user. The first switch activates the first or the first, third and fourth light emitting diodes. The sensor housing has a second switch activated by the sensor when light emanates from the invisible ink and is detected. The switch causes the second light emitting diode to emit white light. The back part of the flashlight has a speaker which plays a sound coded for by the discrete coded zone when light of a particular wavelength reflected from the discrete coded zone is detected.

Figure 1B:
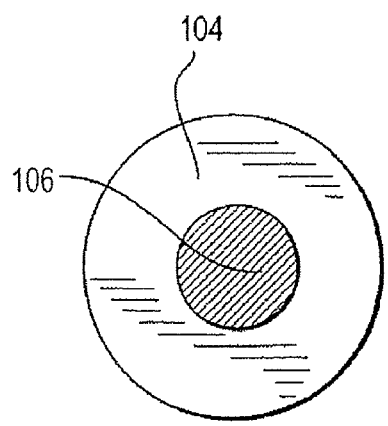
FIG. 1B depicts a visually colored circle from the printed page surrounding a discrete coded zone.
Figure 1C:
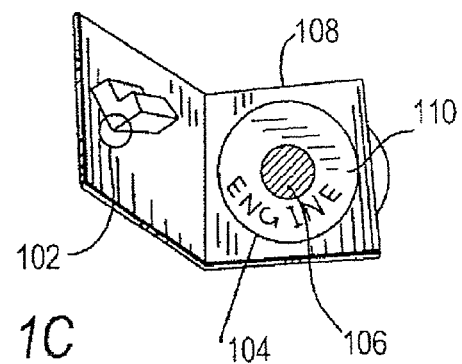
FIG. 1C depicts a close-up of a hinged flap from the printed page of a children's book using the present invention.

FIG. 1A depicts a page of a book for children. The page shown is printed with several images and several colored circles. The colored circles encode sounds associated with the images. These sounds are triggered by the triggering device. Page 100 includes an image of a truck or other artwork 102, text 110 and visible colored circles 104 printed by a traditional four color (CMYK) process. FIG. 1B depicts a colored circle 104 surrounding an annular invisible zone 106 which is printed with invisible ink. A hinged flap 108 is also present, as shown in FIG. 1C. When the invisible ink is detected, the system for detecting and triggering a sound from visible circle 104 is activated. A hidden word may be printed in invisible ink within the annular invisible zone 106. As shown in FIG. 1C, it contains the printed word "ENGINE".

The visual images containing the discrete coded zones may be in irregular shapes rather than circles, rectangles or ellipses. All colored zones are identified as either active or inactive by the presence of absence of the invisible ink. The absence of invisible ink will prevent the sensor from detecting incidental artwork as active colors which encode a presentation. The primary function of the invisible ink is error prevention but it also performs the function of adding hidden messages in the system. The hidden messages are illuminated by the violet LEDs.

Figure 2A:
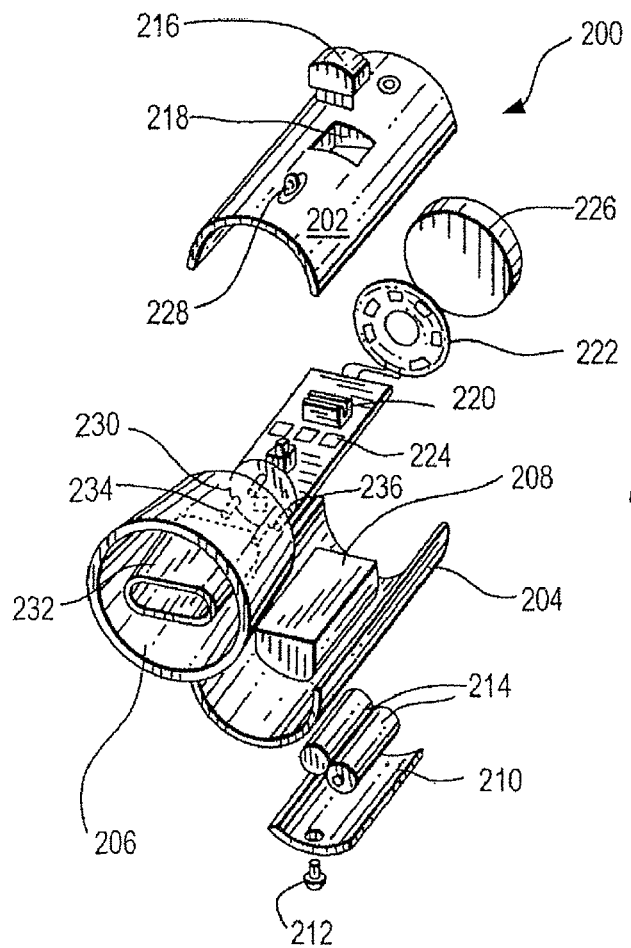
FIG. 2A is an exploded view of a handheld, flashlight-type reader of the present invention, for use in triggering output presentations from discrete coded zones on the printed page.
Figure 2B:
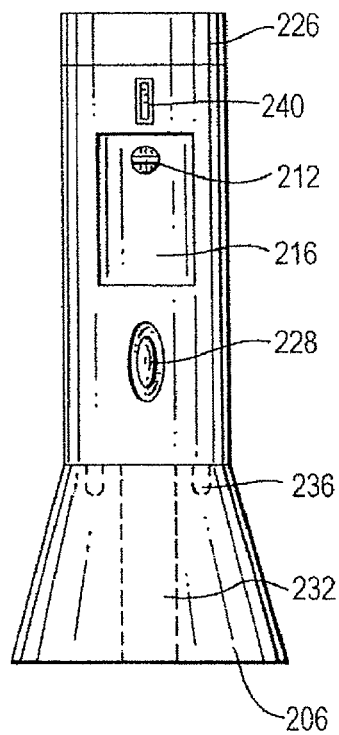
FIG. 2B is an assembled view of the same handheld flashlight-type reader.
Figure 3A:
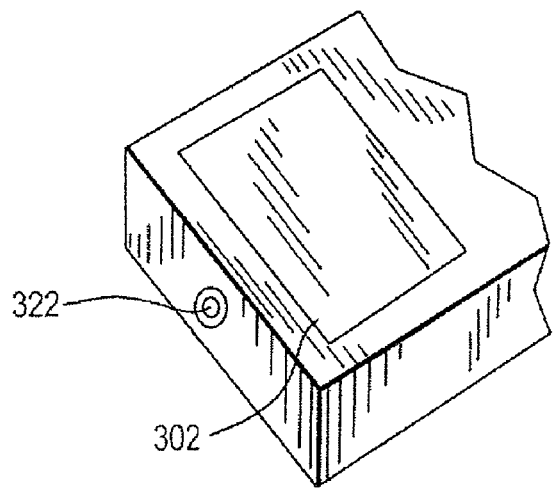
FIGS. 3A-F show a further embodiment of the handheld reader depicting a stylus detector for use in triggering an output presentation from a discrete coded zone within a visual image on the printed page.
Figure 3B:
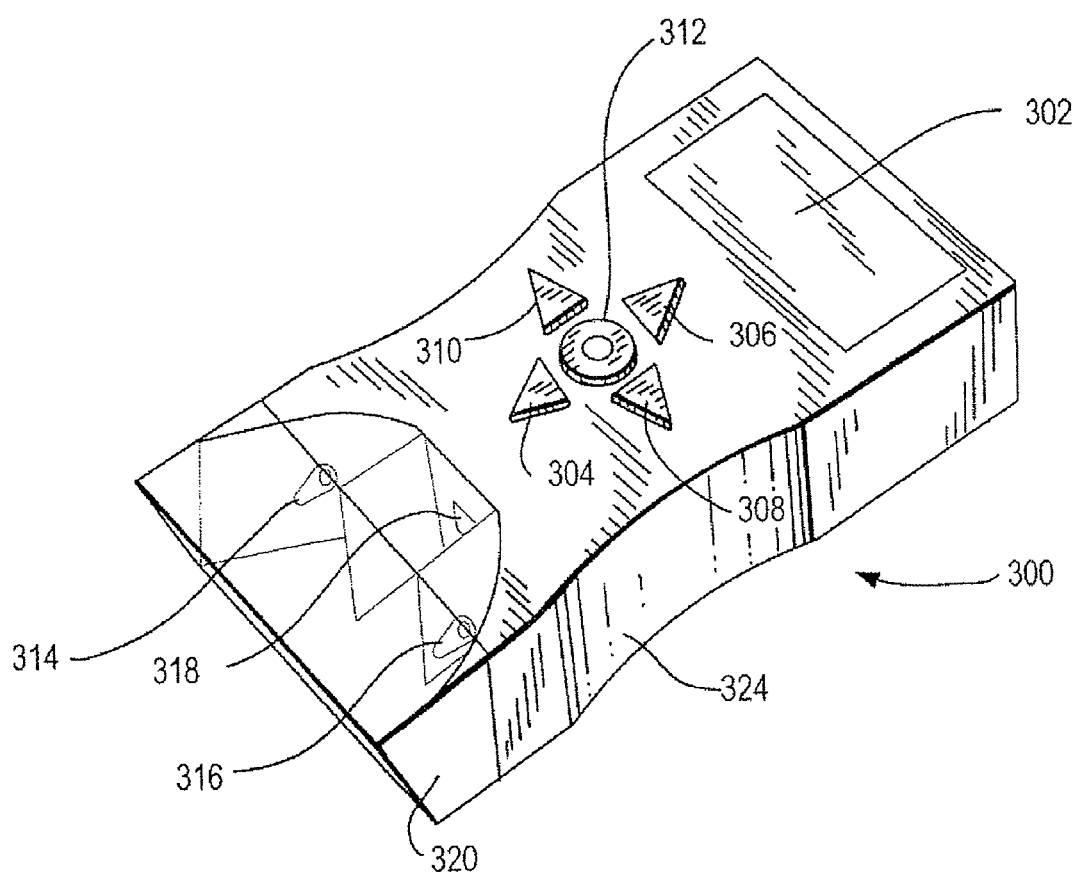
Figure 3C:
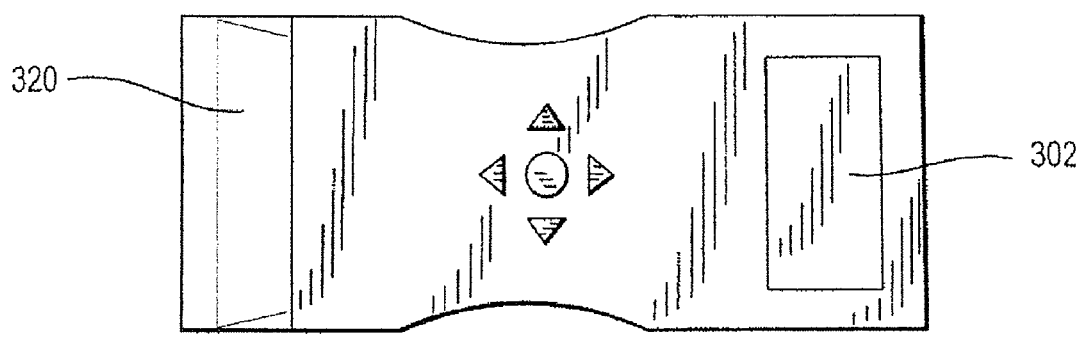
Figure 3D:
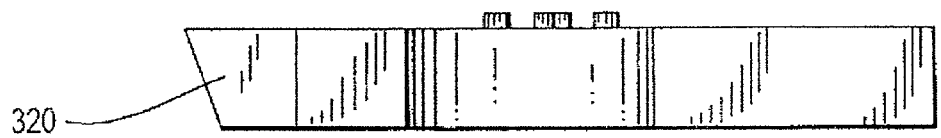
Figure 3E:
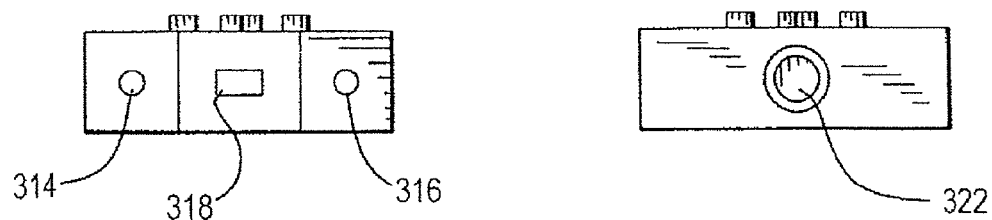
Figure 3F:
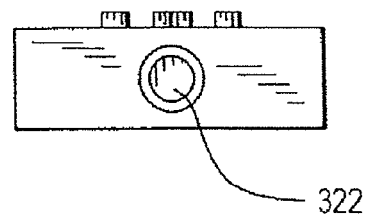

FIGS. 2A-B illustrate a flashlight detector for use in reading educational materials in an exploded view and a side view, respectively. Flashlight 200 includes an outer housing with an outer case 202 and 204 and a clear plastic cone 206. It includes battery compartment 208, battery cover 210, battery cover screw 212 and batteries 214.

Flashlight 200 includes an onboard circuit with software to measure the color values of the colored areas enclosed in embedded memory module 216 inserted into memory module slot 218. Module 216 contains stored audio files, memory module contacts 220, an onboard speaker 222 to play a specific, pre-loaded audio file. Speaker 222 is activated by FM transmitter 224 and is covered by speaker cap 226.

An LED power switch 228 is activated by the sensor when violet light from the invisible medium, is detected by optical color sensor 230 within inner sensor housing 232. The sensor is preferably a Taos 230 color sensor, which is a RGB sensor, although an equivalent RGB or CMYK sensor could also be used. LED power switch 228 causes the flashlight to emit light within the visible spectrum from white LED 234 and violet LED 236. The system plays a sound coded for by a discrete coded zone in the visually colored area of FIG. 1B. The sound signal is triggered when a particular wavelength of light, reflected from the visually colored area, is detected and activates switch 228.

Flashlight 200 also includes headphone jack 233 for headphones so that the reader can hear the audio signals without disturbing or distracting others. The device contains USB jack 240.

FIGS. 3A-F illustrate a further embodiment of the invention including a stylus detector 300 for use with printed or other materials of the invention, from different viewpoints. Stylus detector 300 contains LED screen 302 where an image can be presented. The stylus contains several buttons which allow the user to direct the detector, including a next chapter button 304, a previous chapter button 306, a next track button 308, a previous track button 310 and a play/pause button 312. Stylus 300 can emit and detect light of various wavelengths. It emits light through white LED 314 and violet LED 316. It detects light in sensor 318 and sensor housing 320. The stylus detector can be connected to headphones via headphone jack 322. The device is encased in contoured housing 324 made of plastic or other flexible material.

Figure 4:
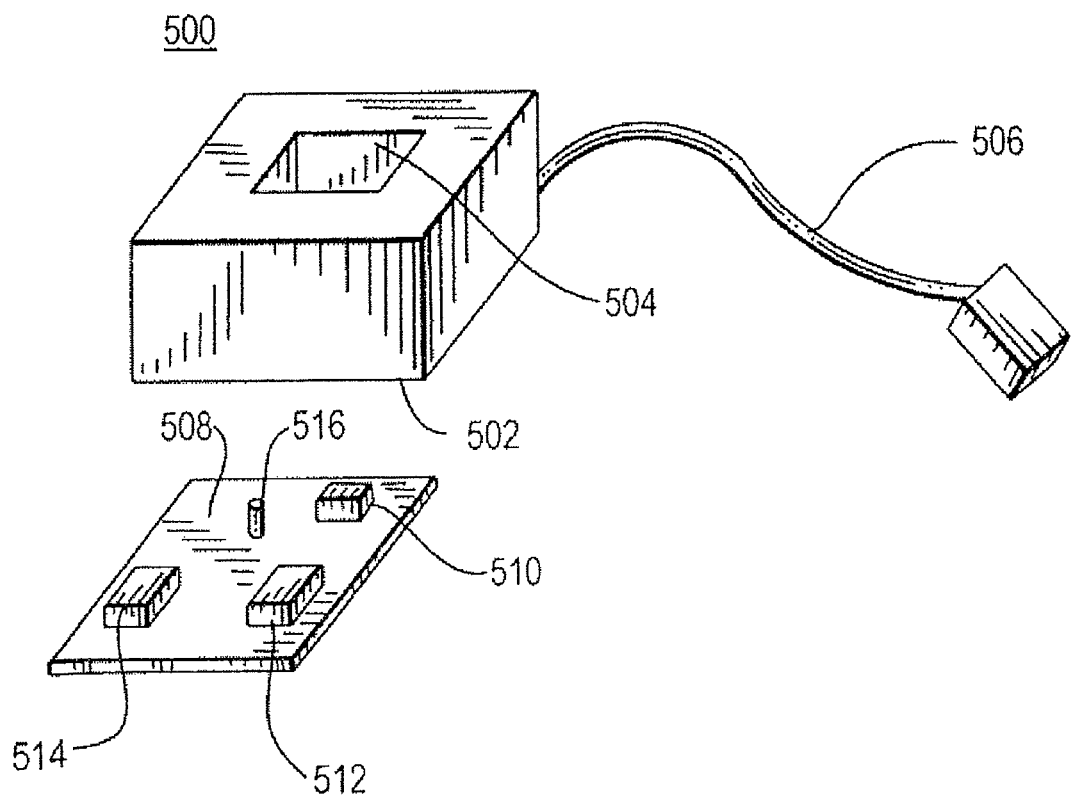
FIG. 4 is an exploded view of a download station of the present invention, used in downloading files to the handheld reader of the present invention with a computer.

FIG. 4 illustrates an exploded view of a download station 500 used in synchronizing the reader with a computer (not shown). The system depicted can detect colors on printed material that correspond to an internet address containing a predetermined output presentation, such as streaming flash animation on a web browser. Download cradle base 502 contains a well 504 for insertion of the reader or stylus. A USB cable 506 connects the base to the USB port of a computer. The system also employs a PCB 508 and a bluetooth wireless receiver 510 for detecting the signal sent from the reader or stylus after it encodes the hyperlink through wireless transmission. A processor 512 processes the hyperlink. The download cradle includes power conditioner 514 and charging pin 516. While the configuration shown in FIG. 4 depicts a download station with a cradle base designed for insertion of the handheld read, the download system can alternatively be a cable which connects directly to the handheld reader.

Embodiments of the invention can be used for educational and entertainment purposes. One embodiment is a book for children 2-8 years old which assists in reading or learning a language. The system will enable the user to hear associated sounds and hidden messages encoded in the printed material that are detected by the reader. The printed pages contain a layer of invisible ink on and/or surrounding colored zones on the pages which code for sounds and/or reveal hidden messages, such as the hidden word illustrated in FIG. 1C.

The books may include discrete circles of solid visible colors on the pages and behind various flaps built into the pages. The circles are printed in a uniform, solid color, but each circle differs from the others in color value, and will include a layer of invisible ink on and/or surrounding the circle.

In a preferred embodiment, the layers of invisible ink are printed in circles that are approximately one half of the diameter of the visible circles. These smaller invisible ink circles are centered within the colored circles. Hidden messages can also be printed on the visible circles using invisible ink. These are printed between the outer edge of the invisible circle and the outer edge of the visible colored circle, as depicted in FIG. 1B.

The invisible ink cannot be seen by the user without the reader but is detectable with the reader. If the reader detects the presence of invisible ink on and/or surrounding a visible colored circle, when the sensor of the reader is placed over the circle, the device will measure the color value of the visible colored circle. After measuring the color value of the visible circle, the reader will play a corresponding audio file associated with the color that has been measured. All audio files are stored on the flash memory chip installed in the reader prior to operation. Different flash memory chips can be provided that correspond to the various audio files contained in a particular book.

In one embodiment, when playing the sound file, the device will activate the additional 405 nm violet LEDs outside the inner tube. This violet light illuminates the hidden word or text message printed on the colored circles. As shown in FIG. 1C, this word may correspond to the visible artwork on the page, as well as to the sounds that the device plays after measuring the color value.

When using the device, the user first opens the book and looks at the page. The user identifies a colored circle printed on the page. The user then places the reader onto the center of the circle so that the inner sensor housing is placed in direct contact with the colored circle. A manually operated switch built into the face of the reader activates a 405 nm violet LED in the sensor. If invisible ink is present on the surface at which the reader is directed, the invisible ink will fluoresce and light from that fluorescence will be detected by the light detector. A switch activated by the light detector will turn off the 405 nm violet LED inside the sensor and turn on the white LED inside the sensor. The violet LEDs outside the sensor and inside the outer tube will also be turned on. The color sensor then measures the visible color value of the circle. The detector and an associated processor then plays the corresponding sound file through the onboard speaker, onboard headphone jack, or external FM radio via the onboard FM transmitter, as shown in FIGS. 2A-B. The two violet LEDs activated outside the sensor housing illuminate the hidden word written in the invisible ink.

Once the device has detected the discrete coded zone, the device will play the sound to completion without interruption, even if the user removes the reader and sensor to break contact with the surface of the printed material. However, the reader will release the pressure switch built into the face of the reader if the user moves the reader to another colored circle and the presence of another discrete coded zone is detected. The device will cease playing the audio file and will commence playing a new audio file corresponding to the new coded zone. If no discrete coded zone is detected in the new position, the device will continue to play the first audio file to completion without interruption.

In another embodiment, the invention can be used by students and adults in a modified form, as indicated in FIGS. 3A-F. The modified student/adult reader shown in FIGS. 3A-F does not include a light cone for revealing hidden messages. However, this reader includes a multipurpose USB computer station, as shown in FIG. 4. The student/adult reader additionally includes a wireless internet hyperlinking transmitter that communicates between the device and computer station. This station, shown in FIG. 4, performs three functions. First, it serves to recharge the rechargeable battery inside the reader. Secondly, the download station depicted in FIG. 4 allows for wireless reception of internet hyperlink triggers from the reader and communicates those hyperlink triggers to a computer connected to the internet via USB cable or an equivalent. Finally, the station serves to download new internet-based audio files into the device in a manner similar to many MP3 players known in the art.

The student/adult reader, like the child reader, detects colors printed onto the pages of text books or other printed surfaces by detecting colors of different wavelengths printed on the page. Active colors may be printed in small (1/4".times.5/8") rectangles or ellipses. The shapes for these zones may be used to designate the types of medium to which it links, e.g., rectangles may play sounds, ellipses may hyperlink to web-based media, etc. The rectangles or ellipses can be covered by a layer of invisible ink to enable the device to recognize the colors as active and/or may be surrounded by a zone of invisible ink. The invisible ink may completely or partially overlay the colored zone.

The adult/child reader pulses a 405 nm violet light at the target. If invisible ink is detected, the reader measures the visible light associated with the particular coded zone printed on the page. The coded zones may be circles, rectangles or ellipses separated from the images on the page or may be printed in smaller color patches or included in the artwork or the text.

The light cone depicted in FIGS. 2A-B is included with the children's embodiment. The outer housing permits the child to register the reader on the coded zone. The student/adult reader does not include an outer housing. It can read a coded zone of any shape but the opening in the sensor housing must be large enough and configured so that it can effectively read the coded zone at which it is directed.

In another embodiment, the invention can be used for entertainment purposes such as a board game. The board games are printed in a manner similar to books, and can employ either the children's or student/adult version of the reader. The board games are used like the books and are printed with both invisible and visible inks that can be detected and measured. Hidden messages in a children's version, audio messages and computer hyperlinked media in a student/adult version will direct and inform the user of the board game.

Another embodiment of the invention includes multimedia printed exhibits. The exhibits may be designed in concert with either of the two readers described. As with the board games, the exhibit is printed in advance with visible and invisible colors corresponding to specific audio or web based media.

Another embodiment of the invention includes additional means whereby the discrete coded zone becomes additionally perceptible. This can be accomplished by using different substances for the discrete coded zone which produce different reactions when illuminated by one or more wavelength of light. These means include, but are not limited to, fluorescence, color shifting, and infrared ink.

What is claimed is:

1. A media asset system comprising:
a surface containing a discrete coded zone within a visual image, wherein said discrete coded zone corresponds to a predetermined output presentation;
a handheld reader having a sensor enabled to detect said discrete coded zone, wherein said reader is capable of producing an output signal corresponding to said discrete coded zone, and wherein said sensor is enabled to receive a light signal from a source;
an audio output device for presenting said predetermined output presentation, wherein said audio output device is responsive to said output signal corresponding to said discrete coded zone;
a memory having a plurality of files; and
a processor in communication with said sensor, said memory, and said audio output device, wherein said processor selects from said plurality of files a file corresponding to said discrete coded zone and initiates said predetermined output presentation of said file.

2. The system of claim 1, wherein said source is the surface containing said discrete coded zone.

3. The system of claim 2, wherein said sensor is enclosed within a sensor housing configured to displace said sensor from said surface so that said sensor effectively reads light from said surface and curtains off extraneous light.

4. The system of claim 3, further comprising an outer housing around said sensor housing, and wherein said sensor housing comprises an opening of sufficient size to read said discrete coded zone.

5. The system of claim 3, wherein said outer housing is transparent and at least one light source is located in a space defined between said sensor housing and said outer housing.

6. The system of claim 1 wherein said memory is removable.

7. A surface including one or more visible images and one or more discrete coded zones corresponding to a particular medium of expression, said one or more discrete coded zones being capable of reflecting light within the visible spectrum in response to a beam of light directed by a handheld reader, and wherein said one or more discrete coded zones are within said one or more visual images.

* * * * *